United States Patent
Fenley

(10) Patent No.: US 10,580,534 B2
(45) Date of Patent: Mar. 3, 2020

(54) METHOD AND APPARATUS FOR PERIODIC ION COLLISIONS

(71) Applicant: John Fenley, Provo, UT (US)

(72) Inventor: John Fenley, Provo, UT (US)

(*) Notice: Subject to any disclaimer, the term of this patent is extended or adjusted under 35 U.S.C. 154(b) by 0 days.

(21) Appl. No.: 16/505,691

(22) Filed: Jul. 8, 2019

(65) Prior Publication Data

US 2019/0341155 A1  Nov. 7, 2019

Related U.S. Application Data

(62) Division of application No. 15/481,061, filed on Apr. 6, 2017, now Pat. No. 10,354,761.

(60) Provisional application No. 62/327,724, filed on Apr. 26, 2016.

(51) Int. Cl.
| | | |
|---|---|---|
| *G21B 1/05* | (2006.01) | |
| *G21B 1/21* | (2006.01) | |
| *H05H 1/18* | (2006.01) | |
| *G21B 3/00* | (2006.01) | |

(52) U.S. Cl.
CPC ............ *G21B 1/05* (2013.01); *G21B 1/21* (2013.01); *G21B 3/006* (2013.01); *H05H 1/18* (2013.01)

(58) Field of Classification Search
CPC ... G21B 1/00; G21B 1/05; G21B 1/11; G21B 1/21; G21B 213/006; H05H 1/18
See application file for complete search history.

(56) References Cited

U.S. PATENT DOCUMENTS

| | | | |
|---|---|---|---|
| 3,030,543 A | 4/1962 | Luce | |
| 3,071,525 A * | 1/1963 | Christofilos | H05H 1/22 376/126 |
| 3,120,470 A | 2/1964 | Imhoff | |
| 3,386,883 A | 6/1968 | Farnsworth | |
| 3,530,036 A | 9/1970 | Hirsch | |
| (Continued) | | | |

FOREIGN PATENT DOCUMENTS

EP  0393461 A2  10/1990

OTHER PUBLICATIONS

Rider, T.H., "Fundamental Limitations on Plasma Fusion Systems Not in Thermodynamic Equilibrium." Massachusetts Institute of Technology, Department of Electrical Engineering and Computer Science, Jun. 1995.

(Continued)

*Primary Examiner* — David E Smith
(74) *Attorney, Agent, or Firm* — Phillips, Ryther & Winchester; Justin K. Flanagan

(57) ABSTRACT

Systems and methods are disclosed herein relating to fusion reactors for fusing particles via multiple periodic collisions. A fusion reactor may include a first evacuated region, such as a chamber, with a plurality of charged particles therein. A uniform magnetic field may be applied to the region to radially confine moving charged particles within the region by inducing circular trajectories. Upper and lower electrodes may be positioned on ends of the region to axially confine charged particles within the region. An energizing beam may be pulsed at a cyclotron frequency corresponding to the mass and charge of the particles to cause oscillating periodic collisions of the particles along the beam path as the particles travel in the circular trajectories with increased velocity after each pulse of the energizing beam.

20 Claims, 12 Drawing Sheets

(56) References Cited

U.S. PATENT DOCUMENTS

| | | | |
|---|---|---|---|
| 3,530,497 A | 9/1970 | Hirsch | |
| 4,172,008 A * | 10/1979 | Fleet | G21B 1/15 376/100 |
| 4,252,605 A | 2/1981 | Schaffer | |
| 4,354,999 A | 10/1982 | Priest | |
| 4,390,494 A | 6/1983 | Salisbury | |
| 4,733,133 A * | 3/1988 | Dandl | H01J 25/005 313/161 |
| 4,788,024 A | 11/1988 | Maglich | |
| 4,826,646 A | 5/1989 | Bussard | |
| 4,853,173 A | 8/1989 | Stenbacka | |
| 5,160,695 A | 11/1992 | Bussard | |
| 5,162,094 A | 11/1992 | Curtis | |
| 6,441,569 B1 | 8/2002 | Janzow | |
| 7,230,201 B1 | 6/2007 | Miley | |
| 8,138,692 B2 | 3/2012 | Macdonald-Bradley | |
| 2001/0043661 A1 * | 11/2001 | Emrich, Jr. | G21B 1/052 376/140 |
| 2002/0186815 A1 | 12/2002 | McGeoch | |
| 2003/0223528 A1 * | 12/2003 | Miley | G21B 1/05 376/113 |
| 2004/0118348 A1 * | 6/2004 | Mills | G21K 1/00 118/723 MW |
| 2005/0084054 A1 | 4/2005 | Franz | |
| 2005/0220243 A1 | 10/2005 | Greatbatch | |
| 2006/0008043 A1 | 1/2006 | Shehane | |
| 2006/0198485 A1 * | 9/2006 | Binderbauer | G21B 1/052 376/121 |
| 2008/0142725 A1 | 6/2008 | Sanns | |
| 2008/0226010 A1 | 9/2008 | Sesselmann | |
| 2010/0181915 A1 | 7/2010 | Rostoker | |
| 2011/0085632 A1 | 4/2011 | Klein | |
| 2011/0200153 A1 | 8/2011 | Ferreira | |
| 2011/0274228 A1 | 11/2011 | Lopez | |
| 2013/0127376 A1 | 5/2013 | Heid | |
| 2014/0301519 A1 | 10/2014 | McGuire | |
| 2016/0035440 A1 | 2/2016 | Navarro-Sorroche | |
| 2017/0309351 A1 | 4/2017 | Fenley | |
| 2018/0047463 A1 * | 2/2018 | McGuire | G21B 1/05 |

OTHER PUBLICATIONS

Barnes, D.C., Mitchell, T.B., & Schauer, M.M., "Beyond the Brillouin Limit with the Penning Fusion Experiment." Meeting of the Division of Plasma Physics of the American Physical Society; Denver, CO., Nov. 1996.

Nadler, J.H., et al., "High-Current Pulsed Operation of an Inertial-Electrostatic confinement (IEC) Device." 18th Symposium on Fusion Engineering, Oct. 1999.

Barnes, D.C., and Turner, Leaf, "Non-neutral Plasma Compression to Ultrahigh Density." Physics of Fluids B: Plasma Physics 4, 3890, Jan. 1992; https://doi.org/10.1063/1.860346.

Fenley, John, U.S. Appl. No. 15/481,061, Notice of Allowance dated May 28, 2019.

* cited by examiner

METHOD AND APPARATUS FOR PERIODIC ION COLLISIONS

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

This application is a divisional application of U.S. patent application Ser. No. 15/481,061 filed on Apr. 6, 2017 and titled "Method and Apparatus for Periodic Ion Collisions," which claims priority under 35 U.S.C. § 119(e) to Provisional Patent Application No. 62/327,724, filed on Apr. 26, 2016 and titled "Method and Apparatus for Periodic Ion Collisions." Both of the above-identified applications are hereby incorporated by reference in their entireties.

RELATED APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure generally relates to systems and methods for creating and maintaining an oscillating population of ions with periodic collisions. More particularly, this disclosure describes methods and systems for creating and maintaining the ion population at fusion energies.

BRIEF DESCRIPTION OF THE DRAWINGS

Non-limiting and non-exhaustive embodiments of the disclosure are described herein, including various embodiments of the disclosure with reference to the figures listed below.

Figure 1A:
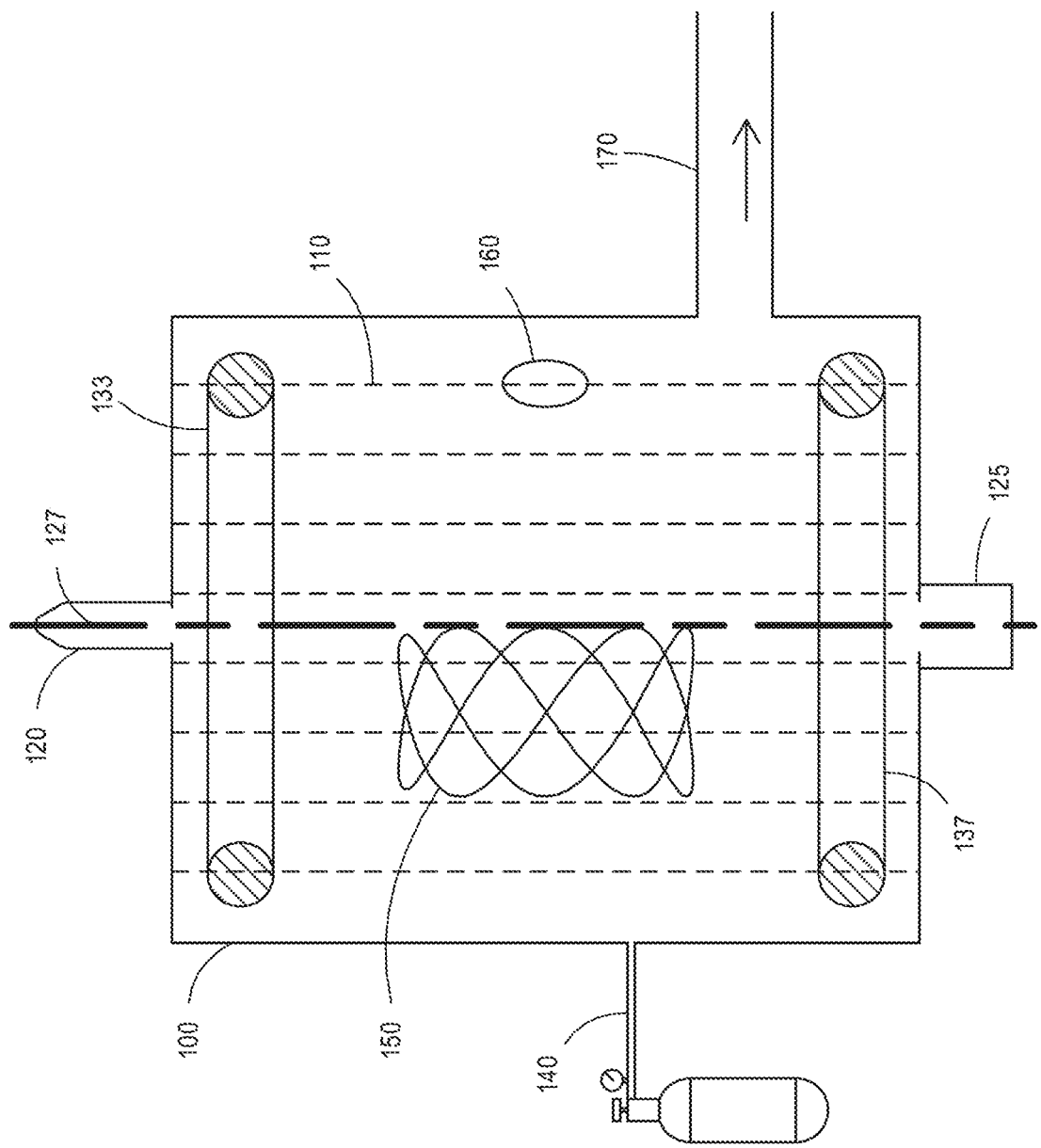
FIG. 1A illustrates a side view of a reactor device and example ion paths, according to one embodiment.

In the figures described above, numerous specific examples are provided for a thorough understanding of some of the embodiments disclosed herein. The systems and methods disclosed herein can be practiced without one or more of the specific details, or with other methods, components, materials, etc. In some cases, well-known structures, materials, or operations may not be shown or described in detail to avoid obscuring aspects of the disclosure. Furthermore, the illustrated features, structures, or characteristics may be combined in any suitable manner in one or more alternative embodiments.

DETAILED DESCRIPTION

Systems and methods are described herein for creating and maintaining an oscillating population of ions with periodic collisions. Specifically, this disclosure relates to an evacuated region or chamber (e.g., a vacuum or near-vacuum chamber), with magnetic and electric fields. Ions within the chamber, such as deuterium ions, may be caused to oscillate as described below. The characteristics of the fields such as strength and shape for electric and magnetic fields, within which the evacuated region or chamber is positioned, may be adjusted based on the types of ions utilized and specific application.

In the examples described herein, the evacuated region is formed by a cylindrical chamber. However, it is appreciated that any shape or method may be utilized and the various components may be adapted accordingly. In many embodiments, the evacuated region includes containment electrodes (e.g., ring or cap/disk electrodes) at one or both ends of an evacuated region to drive the ions moving within the evacuated region toward the center of the region.

A beam source may direct a periodic energizing beam through the chamber (e.g., through the center) to energize the ions in its path. In some embodiments, a beam energy recover system may recover energy from the periodic energizing beam that isn't absorbed by the ions.

In some embodiments, the reactor may be designed for net positive energy production. In other embodiments, a reactor without a net positive energy production (i.e. a lossy reactor) may be adequate for some applications. For example, a lossy fusion reactor may be employed in particle research and/or for certain particle production. In such devices, it may generally be favorable to still have a reasonably high efficiency. In other embodiments, collisions of orbiting ions themselves, or between orbiting ions and unionized particles in the evacuated region, with or without fusion, may be desirable.

For two particles to successfully fuse, it is requisite that that their paths intersect, and that their energy be great enough to overcome the repulsive coulomb barrier between them. Containing and maintaining particles at this energy and in the proper trajectory is problematic because of their tendency to ricochet off each other, barriers, and/or otherwise travel outside of a containment region and/or in paths that do not intersect as desired, if at all. The probability of a fusion reaction is positively correlated with the time the particles remain in their field of containment, referred to as the containment time, the energy of the particles, and the density of the particles within that volume.

As the particles move and collide with the barriers of their container, or with other particles in such a way that fusion does not occur, energy may be transferred into the barriers of the container or be emitted from the particles as photons. Improper collisions may cause one or more particle trajectories to be directed towards the barriers of the container, and/or towards other particles in such a way that does not induce a fusion reaction. If the particles are not directed properly, energy may be lost as light or heat without contributing to fusion reactions.

In some embodiments, particles may be charged to be more easily influenced by electromagnetic forces. In some embodiments, particles may be ionized to create a neutral or non-neutral plasma. Once the particles are ionized, a magnetic field may be used to cause individual particles to orbit around the field lines, thus providing a radial region of confinement within a certain vicinity. That is, a magnetic field may be used to cause ions in motion to travel in a circle with a radius corresponding to the velocity of the particle, its mass, its net charge, and the strength of the magnetic field.

Electric and/or magnetic fields may be introduced or manipulated to provide a barrier that is orthogonal to the radial region of confinement. For example, positively charged ions may move through a set of parallel magnetic field lines in a spiral fashion. A positively charged plate or other positively charged barrier may be used to confine the particles in directions orthogonal to the radial confinement caused by the magnetic fields.

Thus, ionized particles in motion may move in a circular motion within an evacuated region due to a uniform magnetic field. While circular motion in a plane orthogonal to the magnetic field lines is possible, ionized particles may also move in an upward or downward spiral or helical trajectory (relative to the magnetic field). Elements with the same charge as the ions (e.g., positively charged plates or rings) may bound the upper and lower ends of the spiraling particles. As the ionized particles approach the charged confining elements, the ionized particles are repelled in the other direction.

In another embodiment, the magnetic field lines may converge at either end of the spiral, effectively creating a magnetic mirror on each end, which may send the ions spiraling in the opposite direction, thereby creating a region of confinement orthogonal to the radial region of confinement.

In another embodiment, confinement can be achieved via toroidal confinement. In such an embodiment, the magnetic field lines form a complete loop, and the particles are confined to a continuous path.

The present disclosure provides systems and methods for creating, confining, and maintaining an oscillating ion population (fuel) in which most of the excited ions in the device occupy a narrow line (the focus) down the center (or other arbitrary location) of the device once per period. In various embodiments, the ion population may be a single species. In other embodiments, it may be possible to utilize a multi-species ion population to achieve a specific goal or collision objective. For example, multi-species ion populations may allow for a wider variety of fusion products. For a given magnetic field strength, each species of ion in a multi-species ion population may have different cyclotron frequency.

The circular motion (including spiral or helical motion) of ionized particles described herein may be attained using an evacuated chamber, a fuel composed of isotopes within the chamber, a uniform axial magnetic field traversing the chamber, axial confinement, and an energizing beam. The evacuated chamber may contain a certain amount of the fuel. The axial magnetic field is used to restrict ions to helical cyclotron trajectories with a certain frequency, or in some cases a circular motion in a plane orthogonal to the uniform axial magnetic field. In various embodiments, the magnetic field may vary in strength both across the volume of the orbit region, and at various times throughout the ions periodic motion to maintain synchronized motion of particles within the evacuated region.

In various embodiments, axial confinement is further enhanced using Penning trap style electrostatic end cap electrodes, magnetic mirrors, and/or adaptations, variations, and combinations thereof. The charge on these end caps may rise and fall at various times of the periodic cycle to better maintain the desired particle motion. In various embodiments, an energizing beam may be oriented along the magnetic field lines in the center of the device. In other embodiments, a location other than the center of the device is chosen for the energizing beam. The energizing beam may be pulsed at the cyclotron frequency of the charged particles therein to produce and maintain a resonant oscillation among the fuel ions within the device.

In various embodiments, the chamber may be constructed as a circular prism (e.g., a right circular cylinder). In other embodiments, the chamber may be constructed as a prism having any number of sides which are straight or curved. Any prism may be employed, especially right prisms whose joining edges and faces are perpendicular to the base faces. Adaptations are also possible for spheres and polyhedra of various sizes shapes. In some embodiments, a chamber is unnecessary. For example, a chamber may be unnecessary in some instances if the device is used outside of the atmosphere of a planet or other body.

Embodiments that employ a chamber may be formed with an enclosed volume larger than the volume required by a majority of the ion population's average helical cyclotron trajectories at our near fusion levels to avoid unwanted collisions between ions and the chamber wall. Embodiments that employ various cuboids and oval/circular cylinders may be stacked easily and share components, as described below. One or more inlets or outlets may be used to evacuate the chamber and/or maintain a vacuum, as well as to allow the energizing beam to enter and exit. The same inlet(s) and/or outlet(s) may be used for one or more purposes such as to evacuate spent fuel and/or add new fuel. In various embodiments, a chamber may be evacuated using one or more vacuum apparatus, such as a vacuum pump (e.g., an electrically driven vacuum pump, an oil diffusion pump, a turbomolecular vacuum pump, and/or a vacuum generator, such as a compressed air driven vacuum generator. In some embodiments, the vacuum required is hard, with a mean free path of several kilometers or more, while in others, a softer vacuum will suffice to produce the desired collisions.

The fuel for the reactor device may be any of a wide variety of isotopes and ionized particles, that can be excited with pulsed electromagnetic energy (e.g., a laser or electron beam). Examples of isotopes that can be used include tritium and deuterium. Further, the fuel may include a variety or combination of various isotopes. According to various embodiments, fuel may be allowed to enter the orbit region during operation to maintain an adequate ion population by means of a gas delivery system.

As previously described herein, the evacuated region may be positioned within an axial magnetic field that traverses the chamber such that the field lines are orthogonal to the axial containment regions. The magnetic field lines can be ideally parallel to each other and may be uniform or shaped to correct for instabilities in particle motion.

In some embodiments, the magnetic field lines may be caused or allowed to converge, turn, or be otherwise manipulated once they leave the critical region where fusion occurs or is designed to occur. In one embodiment, the magnetic field lines may be provided by resistive or superconducting electromagnets. The chamber of the device may be placed in or near the center of the coils of the electromagnets where the magnetic field is strongest and most uniform. In another embodiment, the chamber of the device may be placed outside of the coils of one or more electromagnets in a region where the combination of magnetic fields is uniform. One or more Halbach arrays may be used to create an appropriate magnetic field using permanent magnets, alone or in conjunction with electromagnets.

The strength of the magnetic field can be easily manipulated by increasing or decreasing the amount of current through a coil to allow for variations in radial confinement. A magnetic field controller may adjust the magnetic field strength. According to another embodiment, temporary and permanent magnets may be employed. In some embodiments, temporary and/or permanent magnets may be used in combination with an electromagnetic.

In some embodiments, a Penning trap style electrostatic cap, ring, or electrodes of a different geometry may be used for axial containment/confinement orthogonal to the magnetic field lines. For example, positively charged caps (e.g., a disk) or rings at both ends of a cylindrical chamber may axially confine or contain positively charged deuterium between the two ends of the cylindrical chamber. Similarly, negatively charged caps or rings at both ends of a cylindrical chamber may axially confine or contain negatively charged particles such as electrons between the two ends of the cylindrical chamber. Hyperbolic electrodes, or other shapes and combinations of electrodes may be used to influence ion motion in various ways.

Variations in adaptations can be made for other types of confinement or containment methods. For example, axial containment/confinement may be achieved by having the magnetic field lines converge outside of the critical region where fusion occurs to effectively form a magnetic mirror. According to this method, the ions will be forced to follow the magnetic field lines and likewise converge. Once condensed, the ions will exert electrostatic forces on each other and several of the ions may be repelled back towards the center of the chamber. With the addition of positively charged electrodes near or around the points of convergence, the number of ions repelled back to the center of the chamber may increase.

According to another embodiment, electrodes may be placed at either end of the chamber, as well as around the middle of the chamber. The electrodes may then be pulsed with appropriate charges to trap the ions in an adaptation of a Paul radio-frequency trap. The strength of the charge on the electrodes in various embodiments may be varied to accommodate for desired flexibility or restraint on the axial motion of the ions.

In variously embodiments, the energizing beam may be an electron beam, laser, ion beam, or other mechanism that is capable of ionizing or otherwise energizing the fuel. The energizing beam may be oriented parallel to the magnetic field lines. For example, the beam may be pulsed parallel to the magnetic fields lines from one end of the evacuated chamber to the other end of the evacuated chamber. In many embodiments, the energizing beam may traverse the center of the chamber. The energizing beam may be pulsed at the cyclotron frequency to produce a resonant oscillation with the fuel ions so that many or most of the ions will be condensed at the location of the energizing beam (the focus) of the device once per period.

According to one embodiment, fuel may be added while the beam pulses to allow the added fuel to become ionized or otherwise energized and join existing ions in helical cyclotron trajectories that return to the focus with a shared period. Any ion that experiences a scattering collision at the focus of the device, must return to the focus again after one cyclotron period because of the uniform magnetic field. Energy from the energizing beam that is not transferred to the fuel may be recovered by an energy beam recovery system located at the end of the chamber opposite to the source of the energizing beam.

In some embodiments, post-fusion byproducts, or ash products, cycle through the focus at a different frequency and can be removed via one or more electrodes at the edge of the device to selectively disrupt the helical motion of the ash products when the fuel ions are at the focus. In some embodiments, the removal electrodes may be positioned and pulsed in such a way that the net force on ions at the focus is negligible, while ions outside the focus receive an unbalanced disrupting force causing their orbits to shift, and eventually be removed from the orbit region entirely by a vacuum or other removal system.

According to various embodiments, electrodes placed around the orbital volume of the device could be pulsed at various times to stabilize and correct for instabilities in particle motion that may form in moving plasmas, such as diocotron instabilities, or other unstable orbital modes that may interfere with the well-coordinated and synchronized periodic ion motion within the device.

According to various embodiments, systems and methods employing one or more of the embodiments or combination of embodiments described herein may benefit from the fact that ions in the system often have more than one chance of colliding for fusion. That is, some prior art systems of completely different design, excite ions and then cause only one or a limited number of collisions. If the collision of excited ions does not result in fusion, the energy input into those ions may be diminished or is lost because the ions are in uncontrolled states after the collisions. Many embodiments of the presently described systems and methods allow for a significant number of collisions of the same ions, with a thermal energy distribution. Thus, the embodiments described herein may result in a net positive energy or at the very least, decreased energy losses for a given number of fused particles relative to prior art reactors.

According to one embodiment, energetic fusion products emitted as a result of fusion reactions within the device can be captured by an absorbing blanket. Heat is removed from this blanket by a working fluid and can be used to drive any manner of heat engine or turbine for electrical power or other purposes.

According to one embodiment, electromagnetic fields generated by the periodic ion motion can be directly rectified into electrical power. In another embodiment, the capture of high energy charged particles formed as products from a fusion reaction are captured to drive a charge imbalance that can be used to cause a useful current to flow.

The device can be treated as a steady state system when considered over a large number of cycles at the oscillation frequency. When treated as such, the transient parameters upon turning the device on and off may be treated independently from the average values of those parameters during more stable operation. This may ease the calculations involved in the process and allow for further manipulation of those average values. The steady state effect depends on achieving a resonating effect of scattering and gathering of extant and/or newly added fuel.

To achieve a steady state of operation, or for another purpose, a variety of components or device parameters may be varied. For example, so that fusion may occur more predictably at the focus during each period, the energy density at the focus may be varied. The energy density at the focus may be varied based on device parameters such as energizing beam diameter, height of the device, radius of the device, shape of the device, axial containment methods and relative strengths, magnetic containment field strength, number of energized fuel ions, and/or frequency and quantity at which fuel is added.

In some embodiments, simulations have shown that decreasing the number of fuel ions and/or size of the reaction chamber, and/or the diameter and length of the energizing beam pulse, may increase density and/or net energy production. Decreased height of the chamber may allow for greater synchrony in ion arrival times, and therefore greater density for collisions to result in fusion. According to various embodiments, a device may be made in a wide variety of sizes with corresponding changes in the frequency of operation, strength of confining fields, and other relevant parameters adjusted to fit a desired use case, desired reaction rate, or form factor.

Each of these variable parameters may be adjusted to predictably attain a specific goal or design parameter. For example, increasing the magnetic field strength will decrease the radius of the trajectories of the charged particles. If the radius of the device is held constant, then the magnetic field strength can be adjusted to keep the trajectories within the walls of the device. Alternatively, if the magnetic field strength, and the radius of the trajectories of the particles are held constant, the radius of the device can be adjusted to not interfere with the trajectories up to a certain size corresponding to fusion-level energy states.

The cyclotron frequency is dependent on the charge of the particle, mass of the particle, and magnetic field strength, as shown in Equation 1 below.

$$f = \frac{qB}{2\pi m} \quad \text{Equation 1}$$

In Equation 1 above, f is the cyclotron frequency, q is the charge of the particle, B is the relative magnetic field strength, and m is the mass of the particle. Because the cyclotron frequency is independent of the velocity and radius of the particle trajectory, the cyclotron frequency is also independent of the kinetic energy of the particles. Accordingly, a cyclotron frequency can be determined based on the fuel selected and the magnetic field strength. In some embodiments, the magnetic field strength may be varied periodically and the energizing beam can be correspondingly varied such that the energizing beam pulses at every cycle as the ions collide at the focus, regardless of variations or imperfections in magnetic field.

According to various embodiments, any number of devices may share any combination of an energizing beam, a vacuum system, magnetic and/or electric field sources, confining electrodes, and/or other systems. For example, several devices may be stacked on top of one another to share magnetic field confinement and/or an energizing beam source. In such an embodiment, the top confining electrode for one reaction chamber may act as the bottom confining electrode for the reaction chamber above it. Thus, having several devices stacked may reduce the equipment needed and potentially improve efficiency.

According to one embodiment, the ion population generates a propagating electromagnetic field for direct electrical energy generation via rectification, or for other purposes. In some embodiments, even a lossy reactor may be used to convert pulsed laser energy or electron beams into more heat than would otherwise be generated from the same energy input. Thus, a power generation system may drive a laser or electron beam, which can be used to power a reactor according to any one of the embodiments described herein. The reactor may then generate a total amount of heat from losses and fusion that exceeds the amount that would be generated otherwise.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Nevertheless, features of one embodiment may be combined with features of another embodiment.

An energizing beam may include any of a wide variety of electromagnetic or particle beams. The beam may be pulsed along the axis of the device from either or both directions and may include an electron beam, neutral beam, ion beam, visible light laser, ultra-violet laser, an X-ray beam, a gamma ray beam, and/or the like.

In some embodiments, an energizing beam may be pulsed from other locations and/or from different directions. In such an embodiment, energized particles may have off-center circular trajectories, or other trajectories that may be desired. The device in such cases may have a shape adapted for these trajectories. Various input devices and/or output devices and sensors may be utilized in conjunction with the presently described system to monitor and control operation, or control trajectory characteristics, by adjusting various characteristics including electric and magnetic fields, and energizing beams.

Various control systems may be employed that utilize computing systems, networks, and the like. For example, some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, a PAL, a PLA, a PLD, a CPLD, a Field Programmable Gate Array (FPGA), or other customized or programmable device. The computer may also include a computer-readable storage device, such as non-volatile memory, static RAM, dynamic RAM, ROM, CD-ROM, disk, tape, magnetic memory, optical memory, flash memory, or other computer-readable storage medium.

Suitable networks for configuration and/or use, as described herein, include any of a wide variety of network infrastructures. Control systems for various aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

Some of the embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

Again, in some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

FIG. 1A illustrates a side view of a reactor device and example ion paths 150, according to one embodiment. A vacuum vessel or evacuated chamber 100 is placed in a uniform magnetic field 110, where the magnetic field traverses the chamber/vessel axially. Fuel is introduced at low concentration by means of a gas delivery system 140, while a periodic energizing beam source 120 is pulsed 127 down the focus of the device at the cyclotron frequency. Molecules of the fuel substance in the energizing beam path 127 are bombarded with high energy electrons, photons, ions, or the like and consequently become ionized and energized.

Energy from the energizing beam 127 that is not transferred to the fuel is recovered by an energy beam recovery system 125. Each fuel ion that is hit by the energizing beam is held in a stable energetic ion path, or orbit, as shown by example ion path 150. Thus, a plurality of fuel ions all having been hit by the energizing beam 127 will each be placed in a (potentially unique) energetic ion path, such as ion path 150.

The uniform magnetic field 110 will cause the energetic ion path 150 to be an orbit that includes the energizing beam path 127, and will restrict the ion's radial range of motion to remain within the chamber 100. Thus, the energetic ion paths 150, due to the magnetic fields 110, intersect the focus of the energizing beam path 127 periodically, and do so in sync with the energizing beam pulses using Equation 1, or a variation thereof, above.

Should any ions spiral too far from the center of the chamber 100, positively charged end containment electrodes, including upper electrode 133 and bottom electrode 137, will repel them back toward the center, thereby restricting the axial range of motion of the ions 150. In some embodiments, any ions that are not at the focus of the energizing beam 127 at the time of the energizing beam pulse will have their stable orbit perturbed by a stray particle or ion removal electrode 160 that is charged, periodically, in sync with the energizing beam. These stray ions will gradually drift toward the walls of the chamber 100 where they can be removed by, for example, a vacuum system 170.

Figure 1B:
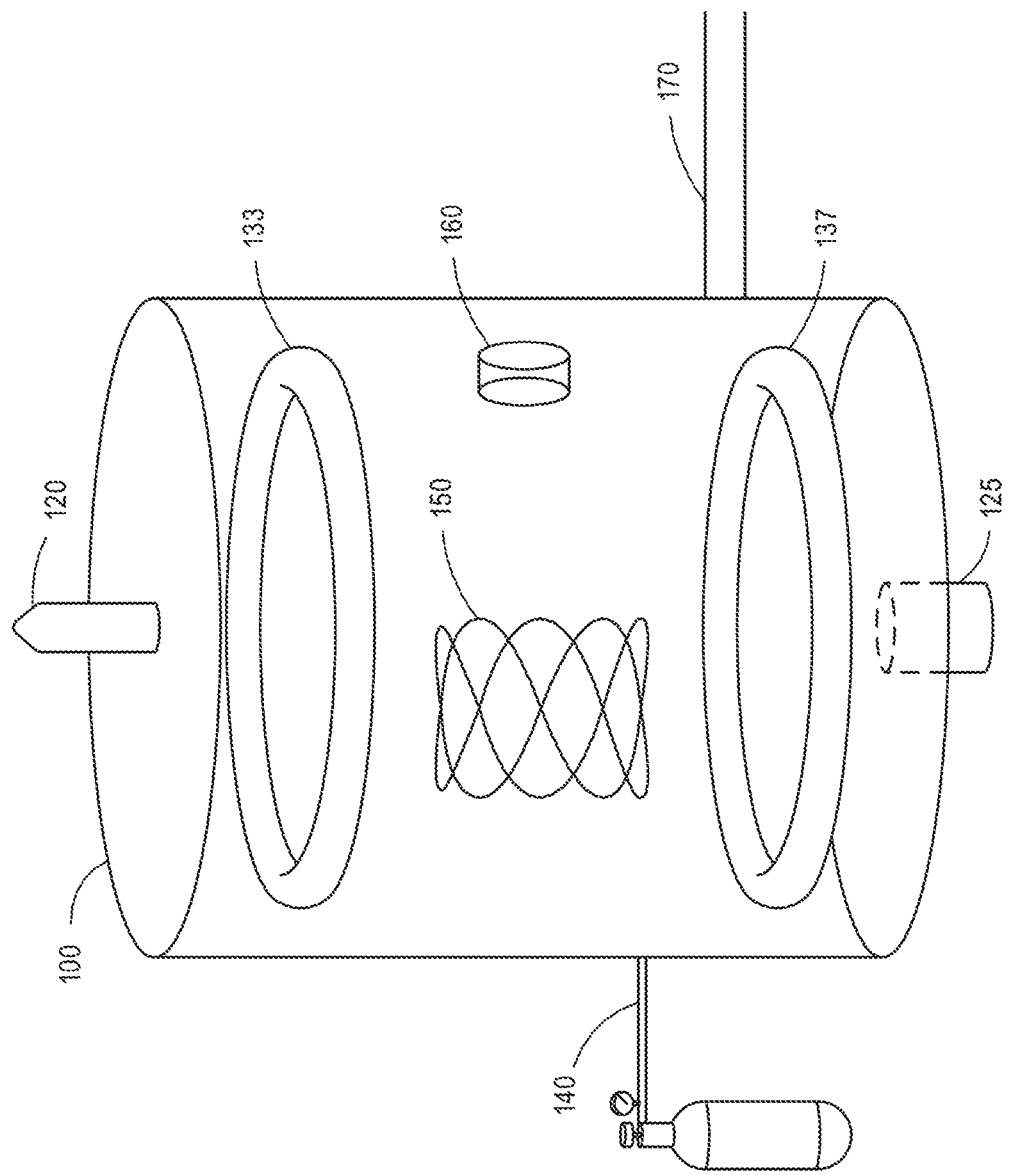
FIG. 1B illustrates a perspective view of the reactor device with example ion paths, according to one embodiment.

FIG. 1B illustrates a perspective view of the reactor chamber 100 with example ion paths 150, according to one embodiment. As illustrated, isotopes, such as deuterium, may be added to the chamber 100 via an inlet 140. Confiding electrodes, illustrated as upper electrode ring 133 and lower electrode ring 137, may be used to axially confine the deuterium (or other isotope). An energizing beam source 120 may pulse a high-energy beam along an axial focus (e.g., the center of the cylinder or an off-center location) at the cyclotron frequency. Again, the cyclotron frequency is determined based on the mass of the particles, the charge of the particles, and the magnetic field within which the chamber 100 is positioned.

As illustrated, a beam collection device 125 may collect unabsorbed energy from the pulsed beam. Stray ions and spent fuel (fused particles) can be collected using stray removal electrode 160 and evacuated via an evacuation system 170.

Figure 1C:
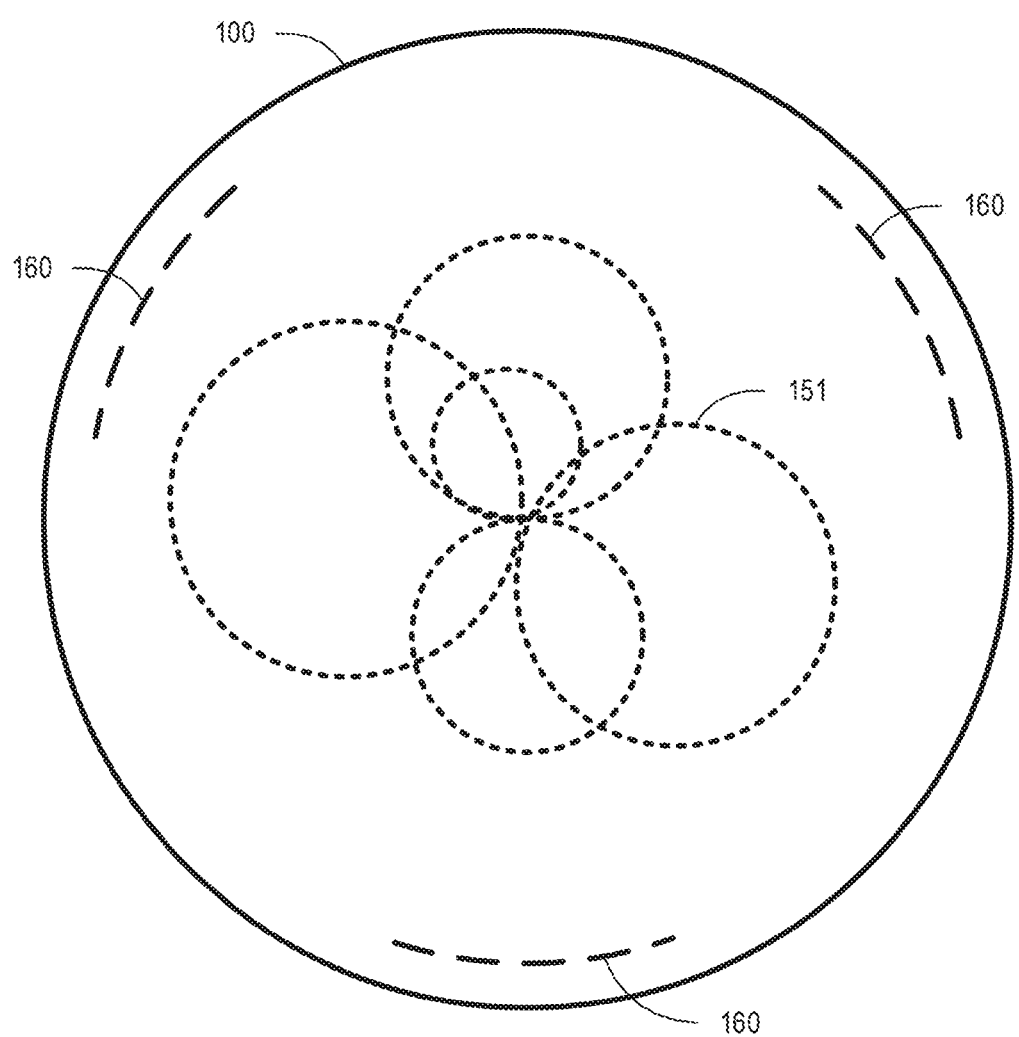
FIG. 1C illustrates a top view of the reactor device with example ion paths, according to one embodiment.

FIG. 1C illustrates a top view of the reactor chamber 100 with example ion trajectories 151, according to one embodiment. As illustrated, each ion path (represented by dashed circles) eventually contacts a central focus point that is within the path of the energizing beam.

Thus, energetic fuel ion trajectories 151 periodically pass through the focus (e.g., axis) of the chamber because the fuel particles were ionized at the center of the device by the pulsed beam, and are bound to circular orbits by the uniform magnetic field (not shown for clarity). As the ions follow their respective trajectories, collisions may occur where the trajectories overlap. Because many or all of the ions cycle through the center of the device, as shown in the drawing, many of the collisions are likely to occur there. Stray ion removal electrodes 160 may be placed at any number of locations within the vacuum vessel 100 and are not limited to any specific or single location.

Figure 2:
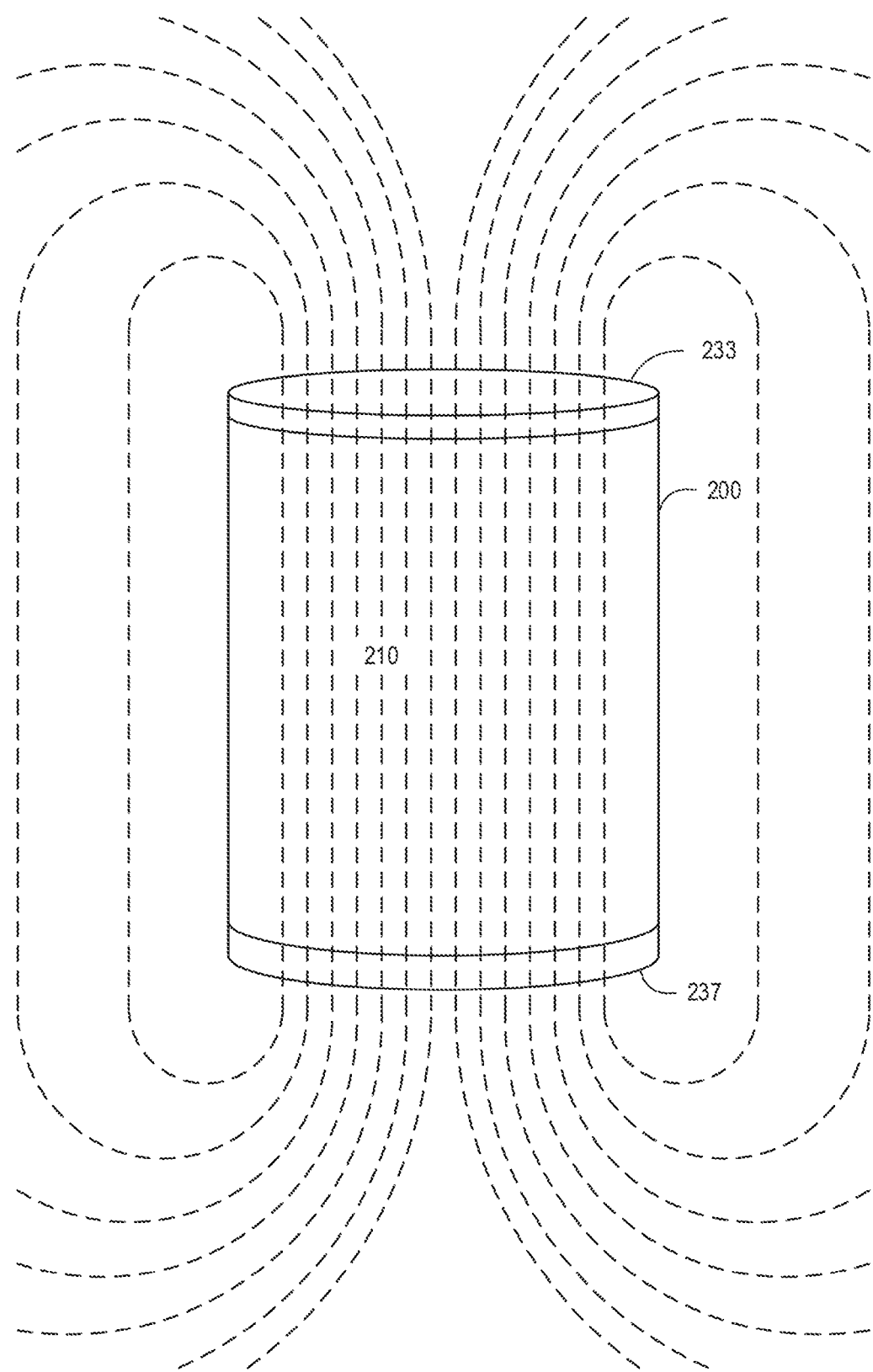
FIG. 2 illustrates a simplified diagram of a uniform field within an evacuated chamber, according to one embodiment.

FIG. 2 illustrates a simplified diagram of a uniform field 210 within an evacuated chamber 200, according to one embodiment. As illustrated the evacuated chamber 200 may include an upper confining electrode 233 and a lower confining electrode 237.

Figure 3A:
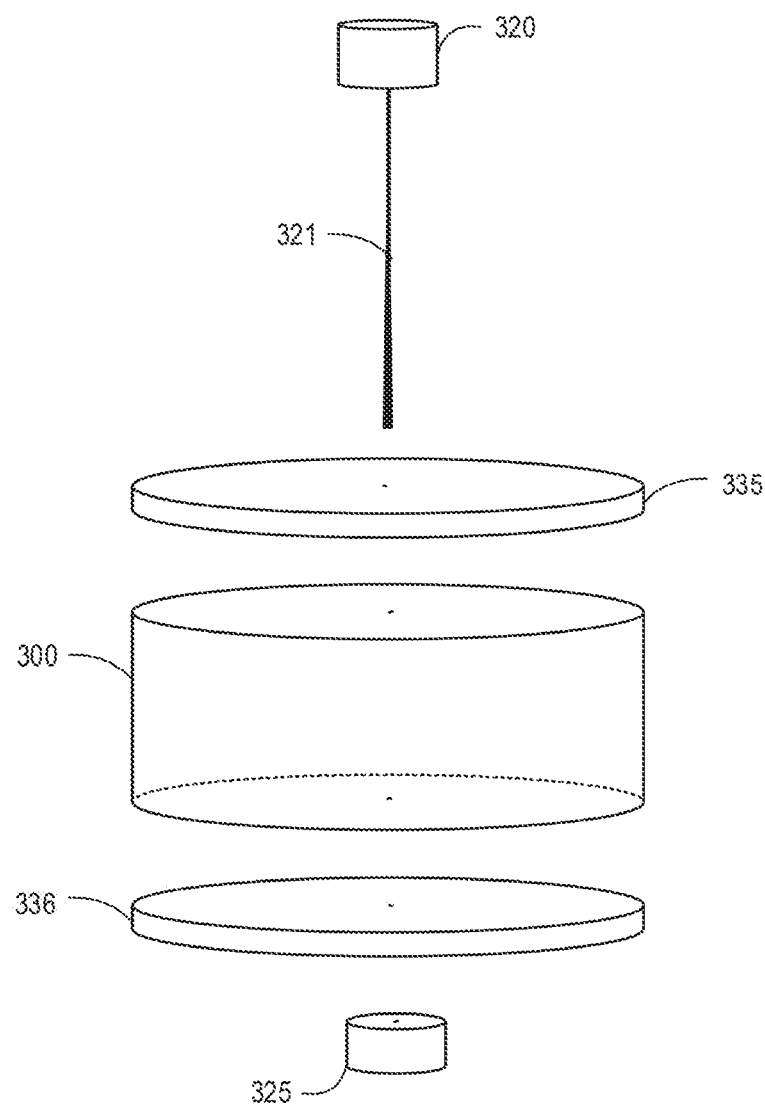
FIG. 3A illustrates an exploded view of a simplified diagram of a single reactor with a beam source, an evacuated chamber, confinement electrodes, and a beam collector, according to one embodiment.

FIG. 3A illustrates an exploded view of a simplified diagram of a single reactor with a beam source 320, an evacuated chamber 300, confinement electrodes 335 and 336, and a beam recovery collector 325, according to one embodiment. As illustrated, beam source 320 may transmit pulses of electromagnetic energy or an electron beam at the cyclotron frequency (or continuously in some embodiments). Each of the confining electrodes 335 and 336 and the chamber 300 may have a physical aperture or electromagnetically transparent (at the relevant frequencies) aperture for the energizing beam to pass axially through to the beam energy recovery collector 325.

Figure 3B:
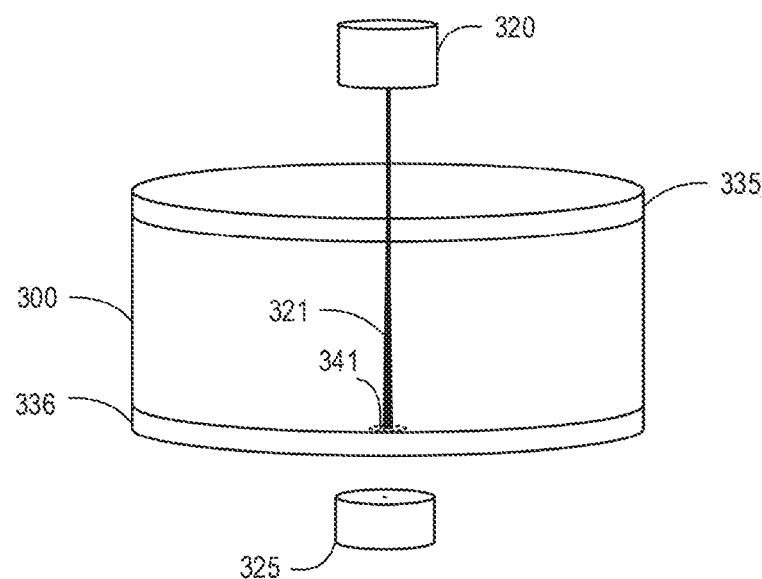
FIG. 3B illustrates the simplified diagram of the single reactor partially assembled, according to one embodiment.

FIG. 3B illustrates the simplified diagram of the single reactor partially assembled, according to one embodiment. In some embodiments, the electrode 335, chamber 300, and/or electrode 336 may be joined together post-production or formed as a single, integrated assembly. Energizing beam 321 is shown projected from beam source 320, through the chamber 300, to the beam energy recovery collector 325. In various embodiments, the aperture 341 (whether a physical aperture or an electromagnetically transparent window) may be wider at the bottom to accommodate for some dispersion of the beam. In some embodiments, the distance may be small enough that the beam may not change in diameter significantly from the top to the bottom.

Figure 3C:
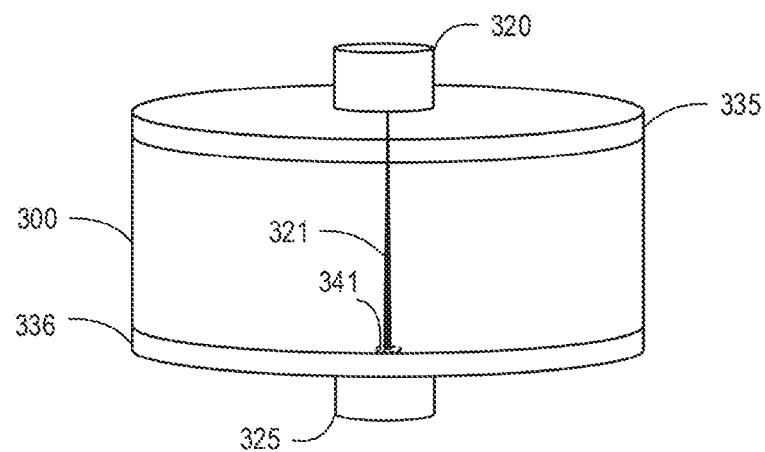
FIG. 3C illustrates the simplified diagram of the single reactor fully assembled, according to one embodiment.

FIG. 3C illustrates the simplified diagram of the single reactor fully assembled, according to one embodiment. In some embodiments, chamber 300 may only be sealed for evacuation (i.e., to create a vacuum state) when joined to one or more of upper electrode 335, beam source 320, lower electrode 336, and/or beam collector 325.

Figure 3D:
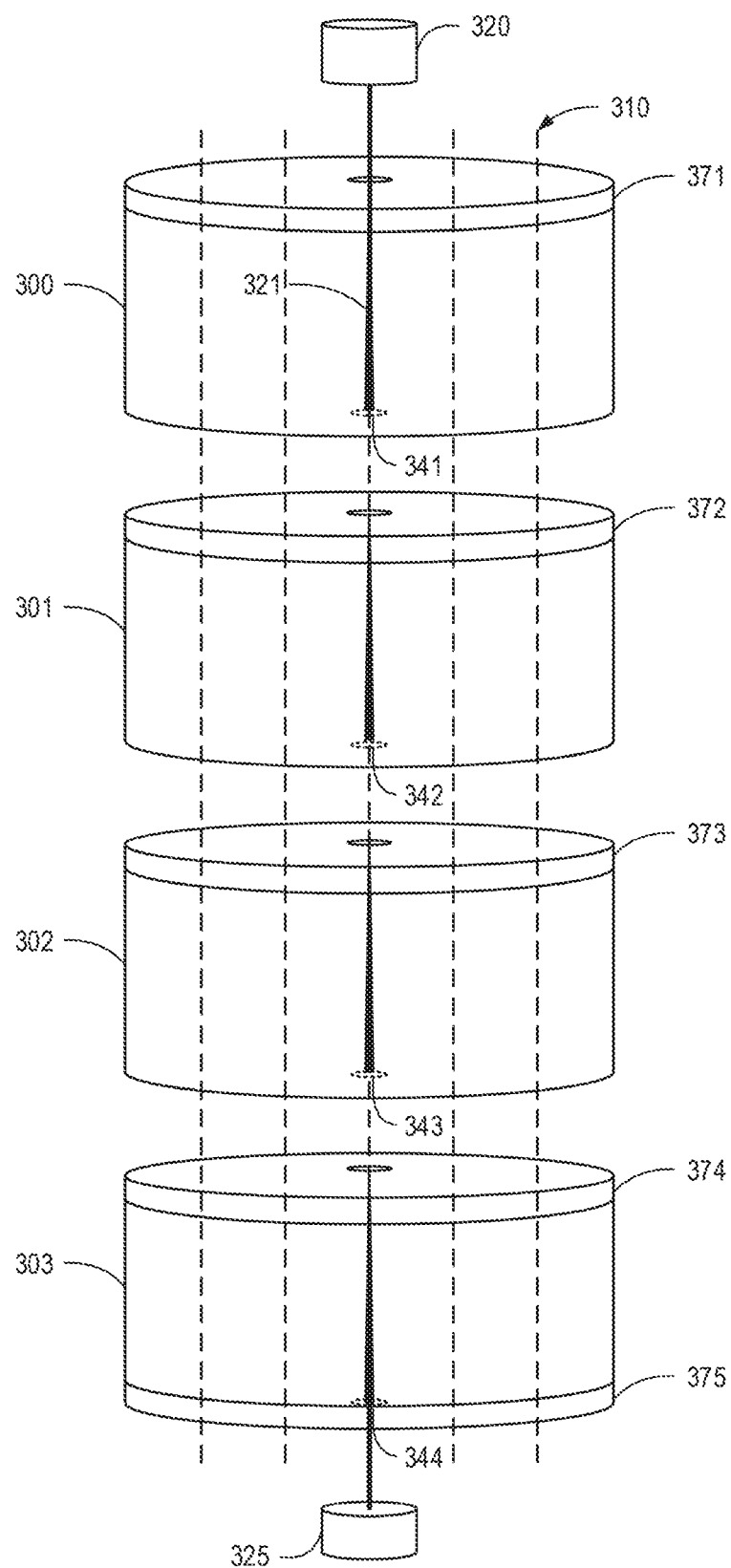
FIG. 3D illustrates a partially exploded view of a simplified diagram of a multi-reactor assembly with shared confinement electrodes and a uniform magnetic field, according to one embodiment.

FIG. 3D illustrates a partially exploded view of a simplified diagram of a multi-reactor assembly with shared confinement electrodes 372, 373, and 374 and a uniform magnetic field 310, according to one embodiment. As illustrated, a beam source 320 may generate an energizing beam for transmission through each of the chambers 300, 301, 302, and 303. In some embodiments, chambers 300, 301, 302, and 303 may be sealed from each other and operate completely independent—other than the shared confinement electrodes 372, 373, and 374 described below.

In other embodiments, the chambers 300, 301, 302, and 303 may be fluidly connected, such that they share a vacuum and are evacuated together. In such an embodiment, a fuel source may be injected into each chamber independently since the confining electrodes 372, 373, and 374 would prevent ions from moving from one chamber to another.

In some embodiments, shared electrodes 372, 373, and 374 may allow energizing beam 321 to pass through an aperture. In some embodiments, each of the apertures 341, 342, and 343 may include a focusing element to re-focus the electromagnetic energy and/or electrons from an electron beam to prevent divergence of the beam as it travels along the axes of the chambers 301, 302, and 303.

Upper confining electrode 371 and lower confining electrode 375 may not be shared since they are the end electrodes. As previously described, collector device 325 may recover unused energy from the beam 321.

Figure 3E:
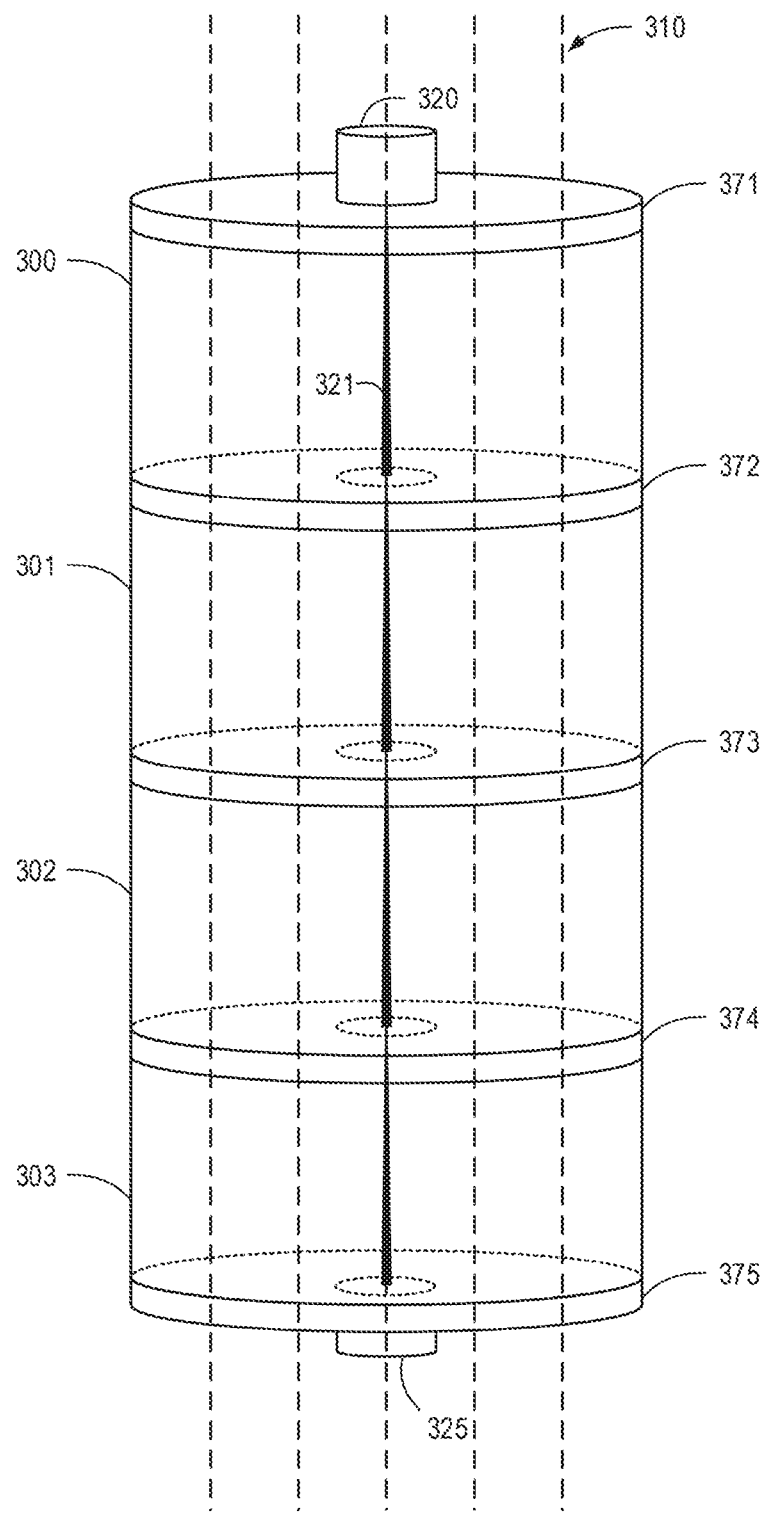
FIG. 3E illustrates an assembled view of the simplified diagram of the multi-reactor assembly with shared confinement electrodes and the uniform magnetic field, according to one embodiment.

FIG. 3E illustrates an assembled view of the simplified diagram of the multi-reactor assembly with multiple chambers 300, 301, 302, and 303, upper confinement electrode 371, shared confinement electrodes 372, 373, and 374, lower confinement electrode 375, and the uniform magnetic field 310, according to one embodiment. As illustrated, the beam 321 may be generated by beam source 320 and transmitted through each chamber 300, 301, 302, and 303 to beam recovery collector 325.

Figure 3F:
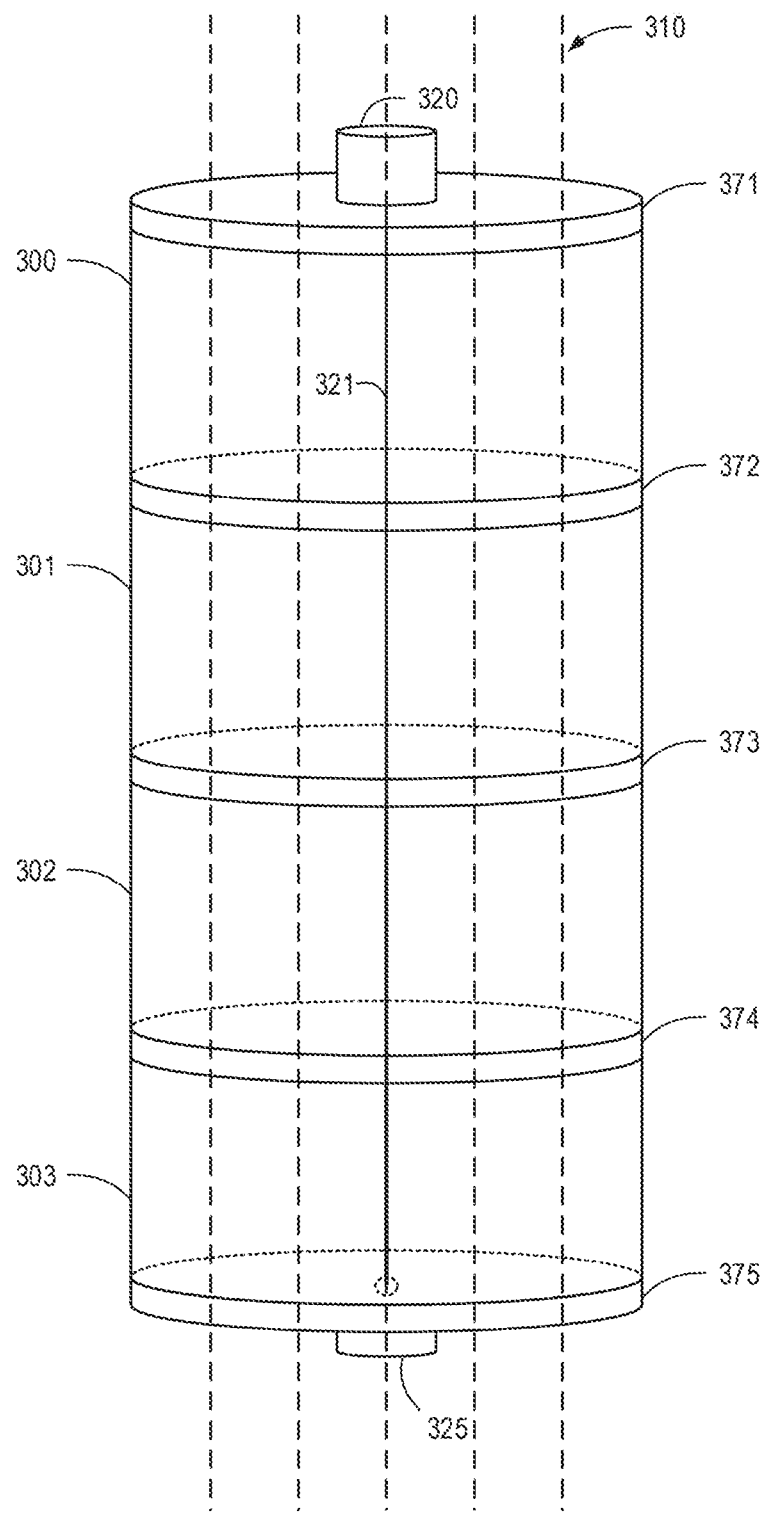
FIG. 3F illustrates an assembled view of the simplified diagram of the multi-reactor assembly with shared confinement electrodes and the uniform magnetic field with a beam that is not refocused, according to one embodiment.

FIG. 3F illustrates an assembled view of the simplified diagram of the multi-reactor assembly with shared confinement electrodes 372, 373, and 374 and the uniform magnetic field 310 with a beam 321 that does not have (or need) refocusing, according to one embodiment.

By stacking multiple chambers 300, 301, 302, and 303, a single energizing beam source 320 may be employed for each of the separate devices. In some embodiments, several stacks of devices as illustrated in FIG. 3E or 3F may be oriented such that they are collectively surrounded by an electromagnet. In this adaptation, there may be a single electromagnet used to provide a uniform magnetic field for an array of stacks of devices, thus further minimizing the amount of equipment needed for a given number of independent reactors. In some embodiments, a beam splitter may be employed to allow for a single beam source to send pulses through each stack in the array of reactor stacks.

In some embodiments, each chamber 300, 301, 302, and 303, may utilize a different fuel. For example, in a three-chamber system, the devices could be configured such that only one fuel species is permitted to enter the first chamber, one different fuel species is permitted to enter the second chamber, and a combination of the two may be allowed to enter the third chamber.

Figure 4:
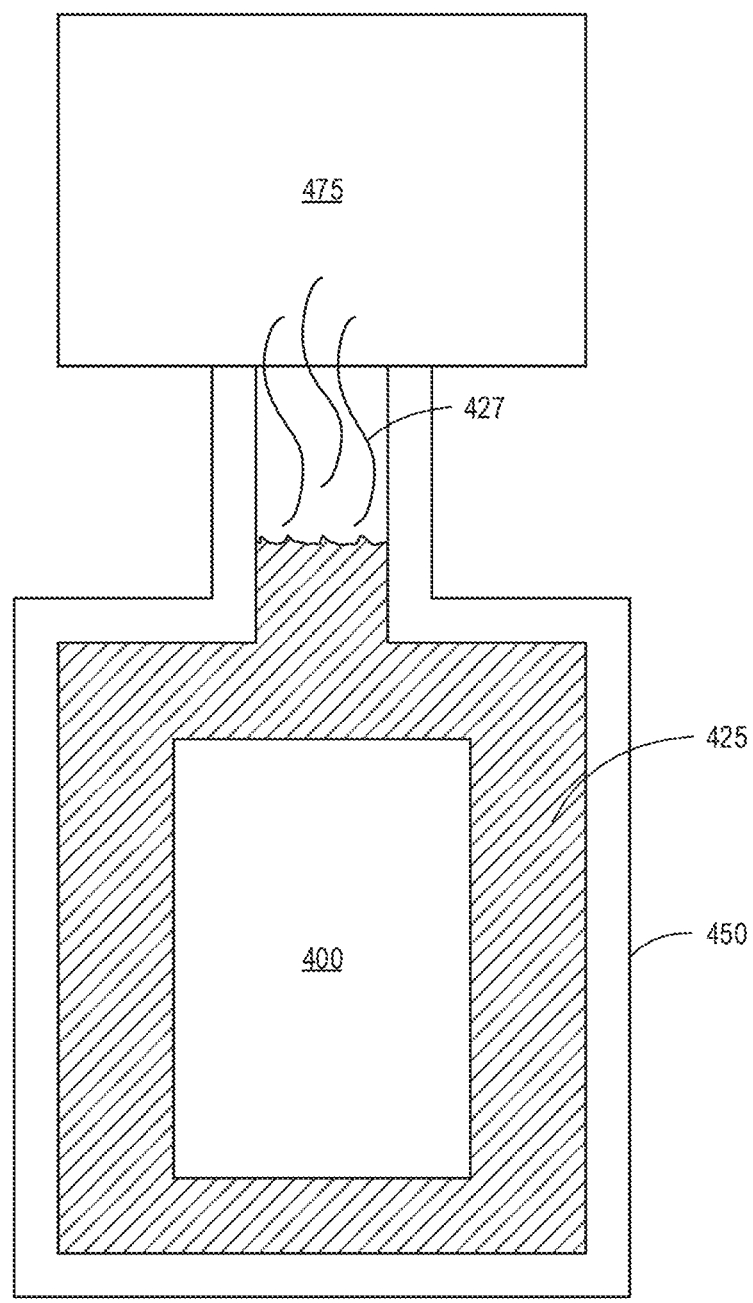
FIG. 4 illustrates a simplified diagram of one use for a reactor in which a working fluid is heated by the reactor to produce steam, according to one embodiment.

FIG. 4 illustrates a simplified diagram of one primary or secondary use for a reactor 400, according to any of the embodiments described herein. As illustrated, a reactor or stack of reactors is illustrated by block 400 that is submerged or surrounded by a working fluid 450 within a chamber 450. The working fluid is heated, at 427, as fusion occurs within reactor(s) 400. The heated working fluid is used to produce work within an energy production device 475.

Figure 5:
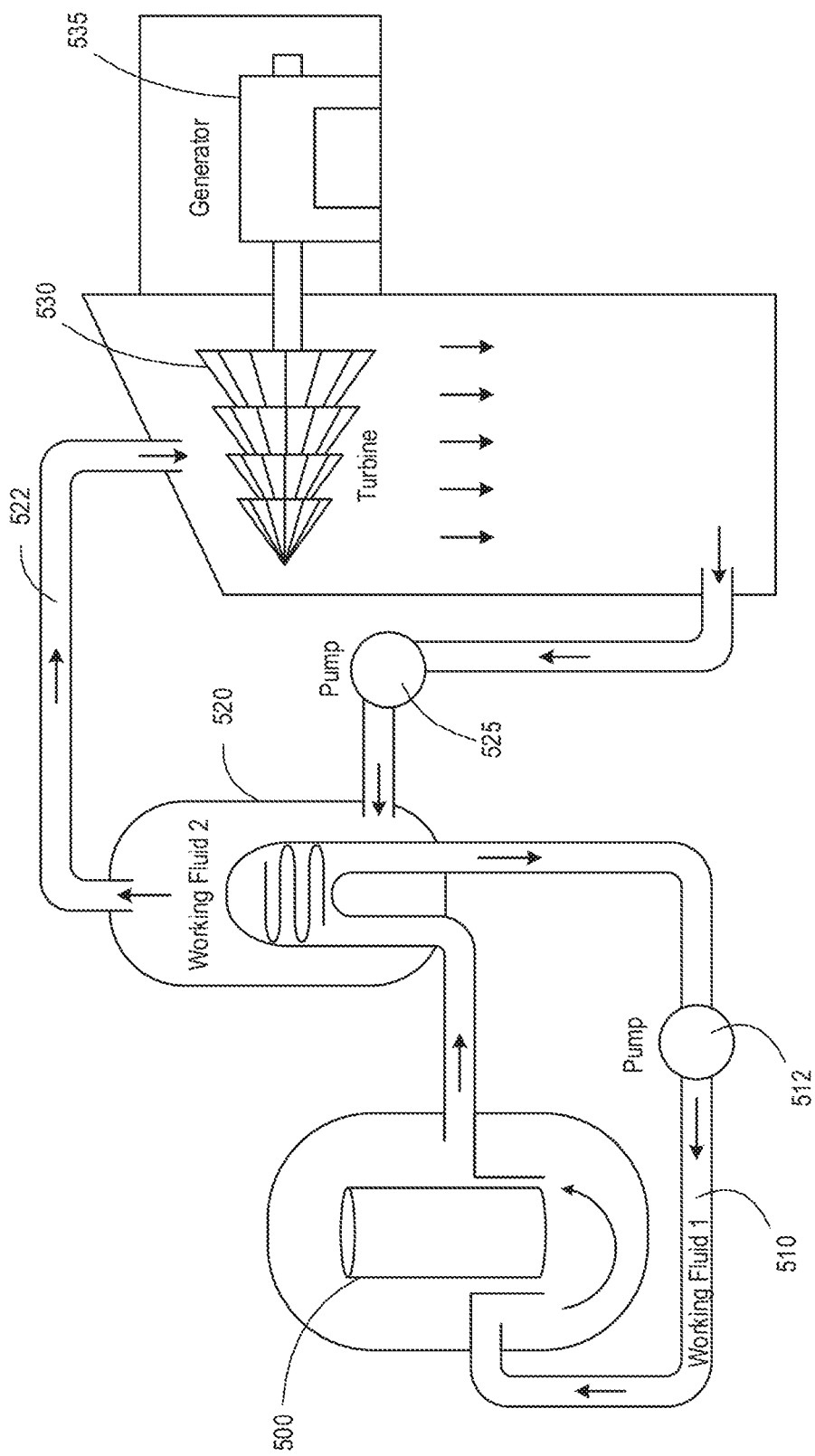
FIG. 5 illustrates a simplified diagram of one use for a reactor in which a first working fluid is used to heat a second working fluid to drive a turbine for energy production, according to one embodiment.

FIG. 5 illustrates a simplified diagram of one primary or secondary use for a reactor 500 comprising one or more fusion chambers according to any of various embodiments described herein, including stacked embodiments and arrays of one or more reactor positioned relative to an electromagnet. As illustrated, a reactor 500 may be used to heat a first working fluid 510 that is pumped or otherwise made to flow around a loop. The first working fluid 510 is used to heat a second working fluid 522 within a heat transfer chamber 520.

The second working fluid 522 may be used to drive a turbine 530 to rotate a rotator relative to a stator of a generator 535 to produce electricity. A pump 525 may return second working fluid 522 to chamber 520 to be re-heated. In some embodiments, pump 512 and/or 525 may be omitted and the working fluid may circulate based on traditional thermodynamic principles of heating and cooling. In other embodiments, compressors may be added to pumps 512 and/or 525 to further enhance the heat transfer process.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. Various embodiments of the present invention(s) in their broadest forms are encompassed by the following claims:

What is claimed is:

1. A method for fusing particles, comprising:
    generating a substantially uniform electromagnetic field within an evacuated region;
    populating the chamber with a plurality of chargeable particles;
    pulsing an energizing beam a first instance along a beam path that is substantially parallel to the uniform electromagnetic field to energize at least some of the chargeable particles and cause them to travel in a circular pattern;
    pulsing the energizing beam a second instance along the same beam path after a period of time corresponding to a cyclotron frequency of the particles that is based on a charge of the particles and a mass of the particles; and
    pulsing the energizing beam a plurality of instances after the second instance at the cyclotron frequency to energize the particles sufficiently to cause at least two of the particles to collide at the location of the beam path with sufficient energy to fuse.

2. The method of claim 1, further comprising bounding the particles along the axis of the beam path in a first direction via a first confining electrode configured to repel the particles.

3. The method of claim 2, further comprising bounding the particles along the axis of the beam path in a second direction via a second confining electrode configured to repel the particles, such that the particles are axially bounded between the first confining electrode and the second confining electrode.

4. The method of claim 3, wherein at least one of the first confining electrode and the second confining electrode comprises a ring electrode.

5. The method of claim 3, wherein at least one of the first confining electrode and the second confining electrode comprises a disk electrode.

6. The method of claim 3, wherein at least one of the first confining electrode and the second confining electrode comprises a hyperbolic electrode.

7. The method of claim 1, further comprising collecting at least one particle via a stray particle collection electrode configured to collect particles that are not on a trajectory that results in being positioned along the beam path when the energizing beam is pulsed.

8. The method of claim 1, further comprising adding additional particles at a rate corresponding to a rate at which particles are fusing.

9. The method of claim 1, further comprising collecting energy from the pulsed energizing beam that is not absorbed by one of the plurality of particles via a beam recovery system.

10. The method of claim 1, further comprising evacuating the evacuated regions via a vacuum apparatus.

11. The method of claim 1, wherein pulsing an energizing beam comprises pulsing a laser beam.

12. The method of claim 1, wherein pulsing an energizing beam comprises pulsing an electron beam.

13. The method of claim 1, wherein pulsing an energizing beam comprises pulsing a neutral atom beam.

14. The method of claim 1, wherein pulsing an energizing beam comprises pulsing a proton beam.

15. The method of claim 1, further comprising injecting additional chargeable particles to replenish the chamber.

16. The method of claim 1, wherein the population of particles comprises deuterium particles.

17. The method of claim 1, wherein the population of particles comprises tritium particles.

18. A fusion reactor for fusing particles via multiple periodic ion collisions, comprising:
    a first evacuated region;
    a first plurality of chargeable particles positioned within the first evacuated region;
    a magnetic field generator to generate a substantially uniform magnetic field with field lines extending from a first end of the first evacuated region to a second end of the first evacuated region;
    an energizing beam source to generate a pulsed beam along an axis of the first evacuated region at a cyclotron frequency corresponding to a mass and charge of an individual chargeable particle of the first plurality of chargeable particles;
    a first confinement electrode to confine particles in a first direction along the axis of the first evacuated region; and
    a second confinement electrode to confine particles in a second direction along the axis of the first evacuated region such that particles are axially confined between the first confinement electrode and the second confinement electrode,
        wherein the magnetic field causes charged particles within the first evacuated region to move in a circular trajectory, and thereby radially confines the particles within the first evacuated region for at least particle velocities less than a velocity required for fusion of the particles.

19. The fusion reactor of claim 18, further comprising:
    a second evacuated region positioned proximate to and axially aligned with the first evacuated region to share the second confinement electrode,
        wherein the field lines of the substantially uniform magnetic field extend from a first end of the second evacuated region to a second end of the second evacuated region;
    a second plurality of chargeable particles positioned within the second evacuated region; and
    a third confinement electrode to confine particles in the second direction, such that the second plurality of chargeable particles are axially confined between the second confinement electrode and the third confinement electrode within the second evacuated region,
        wherein the pulsed beam from the energizing beam source to extend through the first evacuated region and through the second evacuated region along an axis of the second evacuated region.

20. The fusion reactor of claim 19, wherein at least one of the first, second, and third confinement electrodes comprises a ring electrode.

\* \* \* \* \*